United States Patent [19]
Demarest

[11] Patent Number: 4,983,061

[45] Date of Patent: Jan. 8, 1991

[54] FLUID APPLICATOR APPARATUS

[75] Inventor: Scott W. Demarest, Caledonia Township, Racine County, Wis.

[73] Assignee: S. C. Johnson & Son, Inc., Racine, Wis.

[21] Appl. No.: 559,440

[22] Filed: Jul. 26, 1990

Related U.S. Application Data

[63] Continuation of Ser. No. 369,434, Jun. 19, 1989, abandoned.

[51] Int. Cl.[5] ........................ A47L 13/17; A01M 3/00

[52] U.S. Cl. .................................... 401/148; 43/132.1; 401/206

[58] Field of Search ................ 401/206, 148; 43/132.1

[56] References Cited

U.S. PATENT DOCUMENTS

| | | | |
|---|---|---|---|
| D. 29,672 | 11/1987 | Duell . | |
| 2,011,635 | 8/1935 | Homan | 401/148 |
| 2,106,046 | 1/1938 | Barlow et al. | 401/148 |
| 3,147,512 | 2/1961 | Gleason . | |
| 3,148,401 | 9/1964 | Gilchrist et al. . | |
| 3,172,356 | 3/1965 | Vosburg | 401/148 X |
| 3,192,553 | 7/1965 | Schwartzman . | |
| 4,091,966 | 5/1978 | Laauwe . | |
| 4,133,614 | 1/1979 | Baginski et al. | 401/206 |
| 4,230,242 | 10/1980 | Meshberg . | |
| 4,555,194 | 11/1985 | Hammond . | |
| 4,608,045 | 8/1986 | Fretwell | 401/148 X |
| 4,652,163 | 3/1987 | Karliner et al. . | |
| 4,747,720 | 5/1988 | Bellehumeur et al. . | |
| 4,762,433 | 8/1988 | Bergeson et al. . | |
| 4,792,252 | 12/1988 | Kremer et al. . | |

FOREIGN PATENT DOCUMENTS

| | | | |
|---|---|---|---|
| 22592 | 1/1981 | European Pat. Off. | 401/206 |
| 406544 | 1/1963 | Switzerland | 401/148 |

*Primary Examiner*—Steven A. Bratlie

[57] ABSTRACT

A fluid applicator apparatus having a container, an applicator cap, a mechanism for allowing a pre-determined volume of fluid to be pumped from the container into a pad on the applicator cap and a protective over-cap. The pumping mechanism has an attached ball-check valve arrangement which allows fluid transfer from either an upright or an essentially inverted position.

10 Claims, 5 Drawing Sheets

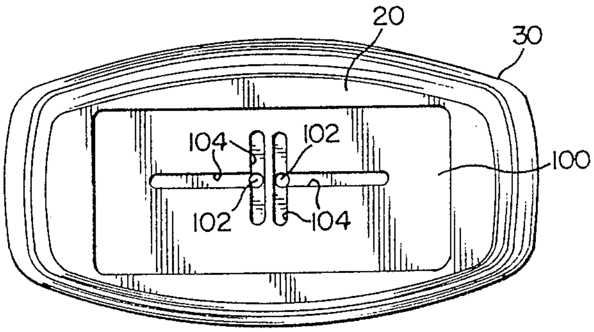
FIG-8
FIG-9
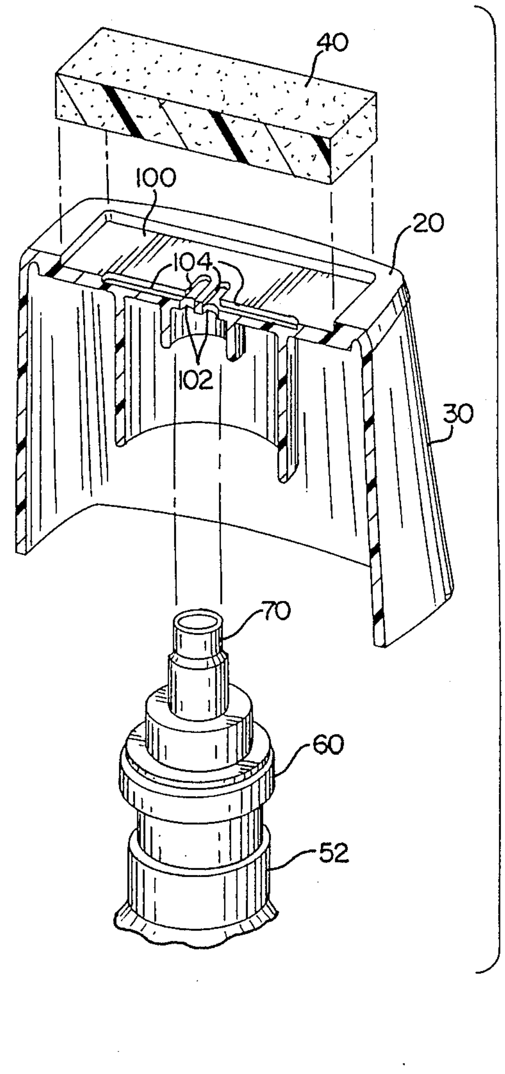

FLUID APPLICATOR APPARATUS

This is a continuation of co-pending application Ser. No. 07/369,434 filed on July 19, 1989, now abandoned.

This invention relates to the field of self-contained manually operable applicators for fluids and particularly to a non-pressurized apparatus that is adapted for one-handed use in any orientation and is designed for application of a fluid to a surface.

BACKGROUND OF THE INVENTION

Many types of self-contained applicators for liquids have been described in the prior art. The extremes may be said to be the pressurized aerosol can and the manually operable applicator combinations. Manually operable applicator combinations have been basically of two types: those that must be inverted so that the liquid contents flow by gravity through some kind of valving mechanism, and pump and dip tube type dispensers that are intended to be operated from an upright or nearly upright position.

An example of the gravity-feed valved applicator is given by U.S. Pat. No. 3,147,512 to Gleason, "Shoe Polish Dispenser."

Manually-actuated pump-container combinations that pump a liquid up from the bottom of a container through a dip tube and out a nozzle which ejects the liquid in the form of a spray or mist are well known. Such combinations are most frequently used for the application of such things as hair spray, colognes, cleaner, or weed killers.

U.S. Pat. No. 4,652,163 to Karlier et al., "Liquid Applicator with Scraper and Method of Use" discloses a gravity-flow type applicator. The applicator has a liquid container with an attached applicator, a detachable scrape overcap, and a separate protective cover. Transfer of liquid between the container and the applicator, which has a sponge on its outer surface, is regulated by a nozzle and spring valve assembly located within the container. The spring holds the nozzle against the inside of the neck of the container and seats the container. When force is applied to the applicator, the nozzle, which is located right under the applicator pad, is pushed back into the container, opening a channel between the nozzle and the neck opening of the container, allowing the liquid to flow out onto the applicator.

An applicator for liquids having a container, a foam applicator, and a ball valve dispensing means is disclosed by U.S. Pat. No. 3,192,553, to Schwartzman, "Dauber Having Spherical Valve Head." This applicator, whose main intended use is the application of shoe polish, has a hollowed tapered opening to the top of the container. A ball, which is seated on a carrier supported by a spring formed by helical coils, is located within and pressed into this opening. When pressure is applied against this ball, it is pushed backwards against the spring and into the container opening, allowing liquid to escape from the container around the ball valve and onto a sponge applicator which covers the container opening ball valve structure. Obviously, no liquid will escape the container unless the applicator device is inverted so that the liquid runs out the opened valve by gravity flow.

U.S. Pat. No. 4,091,966 to Laawe, "Squeeze Bottle Containing A powdered product and Operative Whether Upright or Inverted" discloses a flexible bottle from which powder can be ejected by squeezing the bottle, the powder first entering a U-shaped tube within the bottle and connected to the dispensing orifice. The tube has an opening at the bottom of the U, through which powder enters the tube when the bottle is upright, and an apparatus at one top of the U, through which powder enters the tube when the bottle is inverted.

The problem with existing manually operable applicator combinations having non-pressurized reservoirs is that, as stated before, the operating positions for the two main types are not only opposite but mutually exclusive. A gravity-feed device will not work in the upright position, nor will the traditional dip tube and manual pump work in the inverted position (since the inversion usually leaves the end of the dip tube above the surface of the fluid). This limits the method and direction of application of the fluid onto a surface and requires creative angling on the part of the user. Thus, a manually operable fluid applicator capable of applying a fluid in either the upright or inverted position would facilitate fluid application over a variety of orientations of surfaces. In addition, such a device should have some means of metering the flow of the fluid, a feature built-in to all pump-operated devices but missing from most gravity-feed devices.

When the fluid to be applied is intended for insect control, the advantages of a device capable of applying a neat strip of insect-killing or repelling solution to surfaces of different orientations become even greater.

To briefly summarize the current methods of killing insects: methods of introducing roach and ant, or other insect killers into an area range from the use of fumigators, which disperse the insecticide throughout the area and usually require the removal of foodstuffs from the area, to the application of insecticidal foams to selected areas, a method which is especially effective for cracks and crevices, but one that, when the foam is applied to exposed areas can leave an undesirable residue, to the placing of insect devices such as bait stations in an area.

Pressurized cans for the application of insecticides are frequently used to control insect populations, but there are times when it is desirable to be able to control placement of the insecticide exactly, with no possibility of drift.

Despite this variety of approaches to the problem of killing insects with various types of insecticides, no method or apparatus exists which allows direct and localized application of a liquid insecticide without the necessity of direct user contact with the insecticide to a selected area, whether that area be the bottom of a cabinet or the underside of a shelf. Such a method and apparatus would employ an applicator integrally connected to a container and would allow the user to apply the contents manually and with one hand. Such a method and apparatus would allow the user to stripe insect "barriers" across zones of expected insect travel for maximum effectiveness, stripes that would be invisible yet relatively long lasting, depending upon the formulation of the insecticide used.

Such a method and apparatus would avoid the need for the placing of a separate bait station in an area, but obviously, should not be used on an area that pets or children would be expected to eat from or lick.

Thus, it is an object of the present invention to provide an apparatus for applying a fluid that is self-contained, manually operable, and capable of applying in any orientation, metered amounts of the fluid, so long as enough fluid remains in the reservoir to enter the pumping mechanism.

It is a further object of the invention to provide such an apparatus adapted for use as an insecticide applicator and to describe a method of using such an apparatus for control of insect populations or for keeping insects from reaching an area.

BRIEF DESCRIPTION OF THE DRAWINGS

FIG. 8 is a top view of the applicator cap surface of the embodiment of FIG. 1.

FIG. 9 is an exploded detail side sectional view of (he applicator cap, pad, and part of the fluid transfer means, taken along section line 3—3 of FIG. 1.

DESCRIPTION OF THE PREFERRED EMBODIMENT

In the description of the preferred embodiments, like reference numbers are used on the different figures to refer to like parts.

Figure 1:
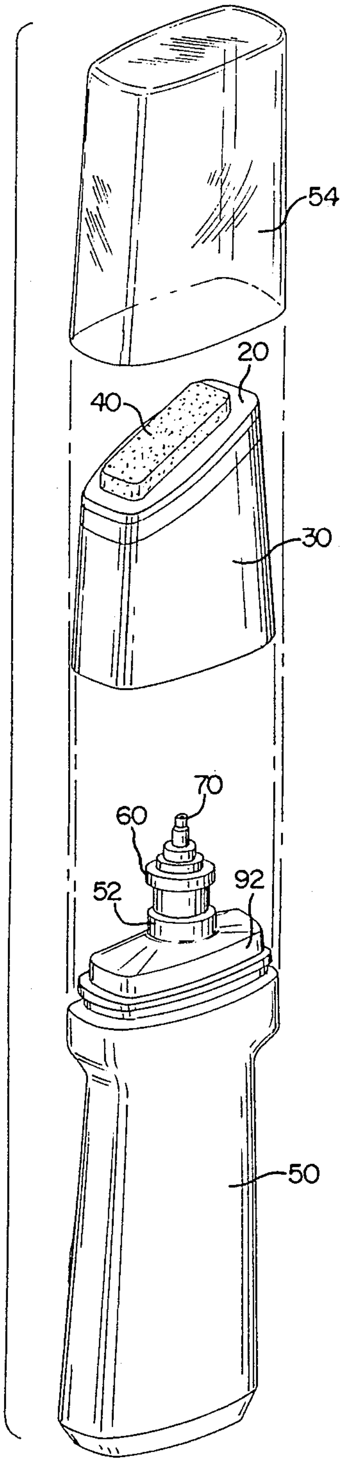
FIG. 1 is a partially exploded perspective drawing of one embodiment of the invention.
Figure 2:
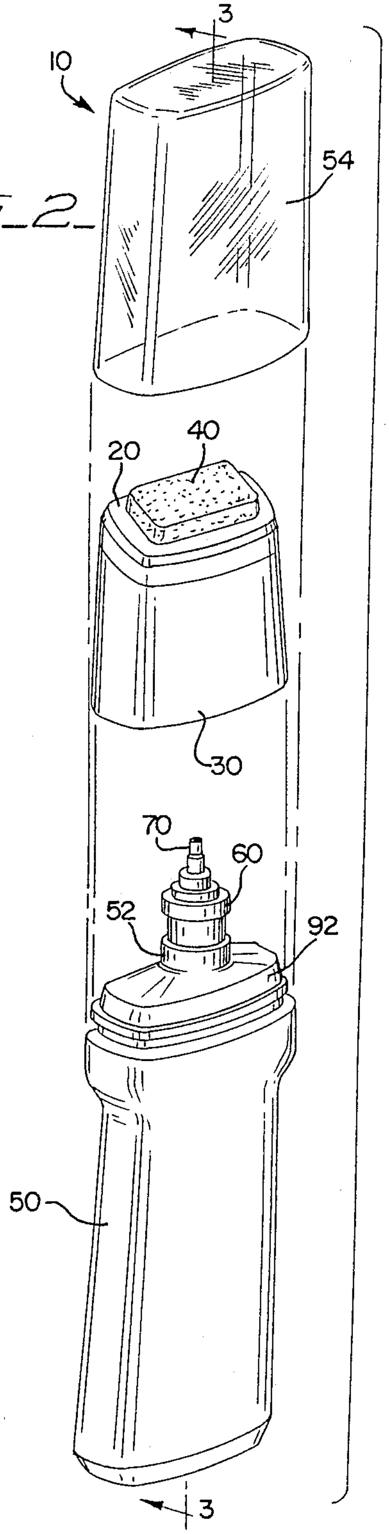
FIG. 2 is a partially exploded perspective drawing of a second embodiment of the invention.

FIGS. 1 and 2 show partially exploded views of two possible embodiments of fluid applicator apparatus 10, functionally similar but differing in the orientation of the top surface 20 of applicator cap 30 and of pad of porous material 40. FIGS. 1 and 2 also show fluid reservoir 50, protective overcap 54, closure cap 60, which sits over the neck 52 of fluid reservoir 50, and, emerging from closure cap 60, fluid outlet 70 (which is part of fluid transfer means 80 which is itself not visible in FIGS. 1 and 2).

Figure 3:
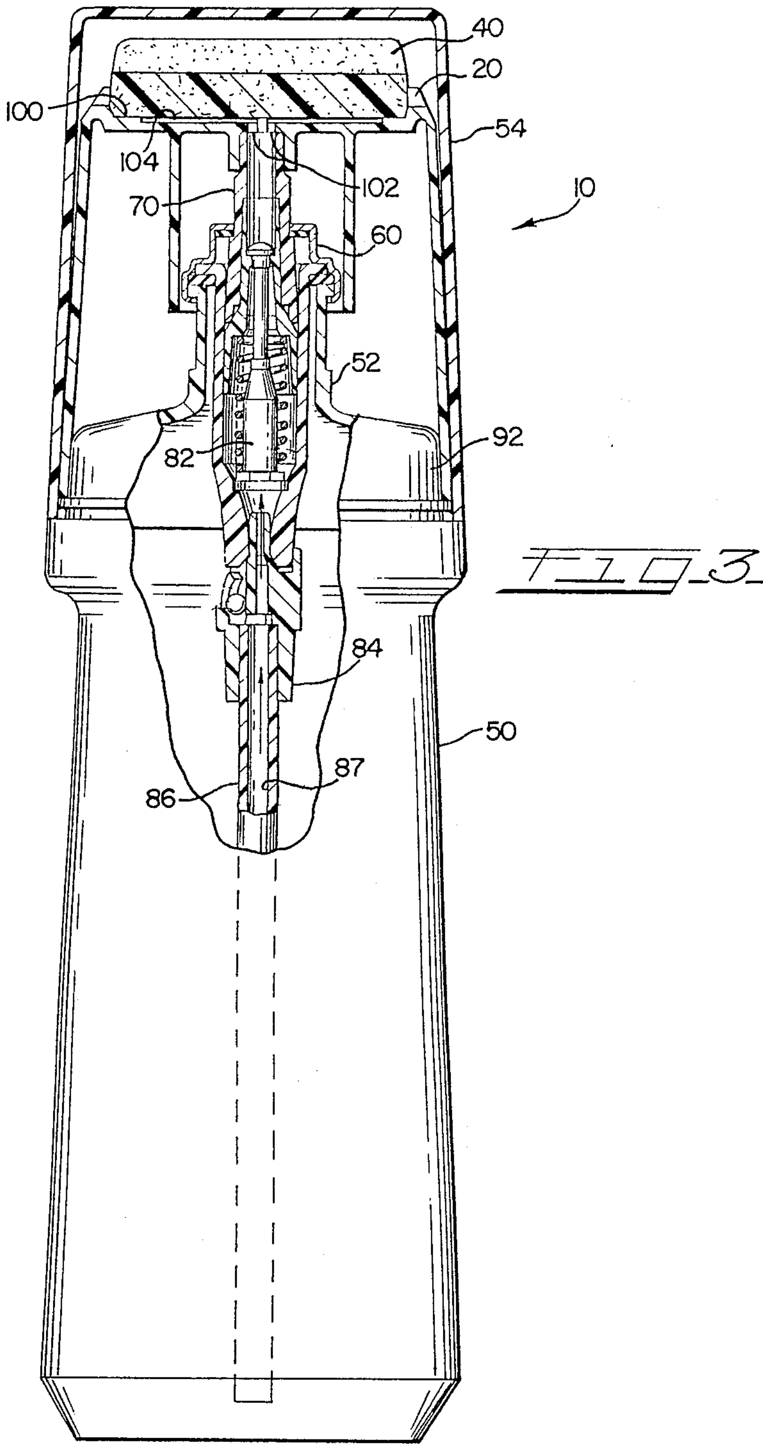
FIG. 3 is a partial side sectional view of the embodiment of FIG. 1 taken along section lines 3—3 showing the invention in an essentially upright position, with fluid transfer mechanism depicted schematically.

As FIG. 3 shows, fluid transfer means 80 includes a pumping mechanism 82, a ball check valve assembly 84, a dip tube 86 extending from the bottom of the combined pumping mechanism and ball check valve assembly toward the bottom of fluid reservoir 50, the dip tube having fluid inlet 87 at its bottom end, fluid outlet means 70 situated on the top of pumping mechanism 82 and extending through closure cap 60. In manufacture of the apparatus, fluid transfer means so can be crimped into the neck of the fluid reservoir, making refill impossible but minimizing access to the contents and thus adding child protective feature to the device. Alternatively, the neck 52 of fluid reservoir 50 and closure cap 60 may be configured with matching screw threads, which would allow the apparatus to be opened to allow refill. Details of the preferred embodiment of ball check valve 84 are further shown in FIGS. 6 and 7.

Figure 6:
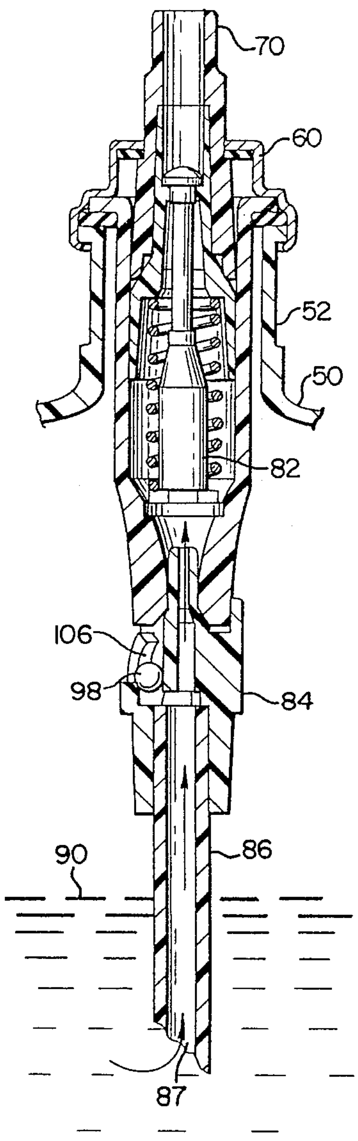
FIG. 6 is a sectional detail view of the fluid transfer mechanism of the invention oriented in an upright position.
Figure 7:
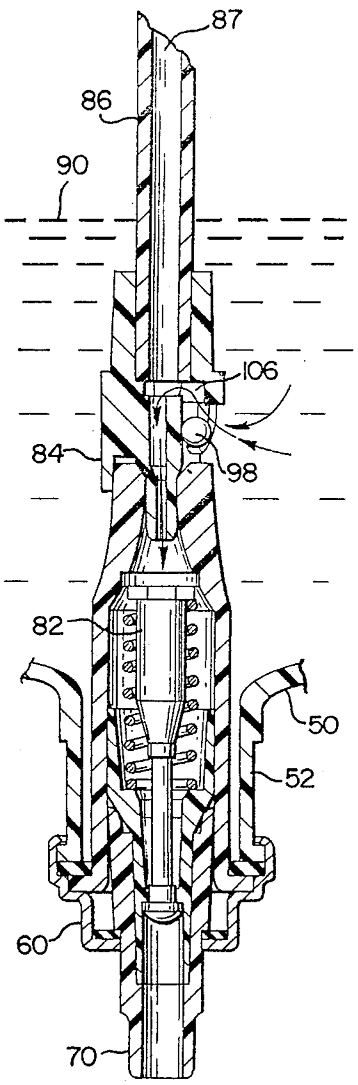
FIG. 7 is a sectional detail view of the fluid transfer mechanism of the invention oriented in an essentially inverted position.

FIG. 3 shows the fluid applicator apparatus in the upright position, the position in which the apparatus would be oriented to apply a strip of insecticide to the underside of a cabinet or like surface, the applicator being filled with fluid 90 (illustrated only in FIGS. 6 and 7). When the apparatus is pushed against a surface, pressure is applied to the pad of porous material 40, and to applicator cap 30. This pressure forces applicator cap 30 and fluid reservoir 50 to telescope against each other as applicator cap 30 slides back toward the main portion of fluid reservoir 50 along slide area 92 of fluid reservoir 50.

Figure 5:
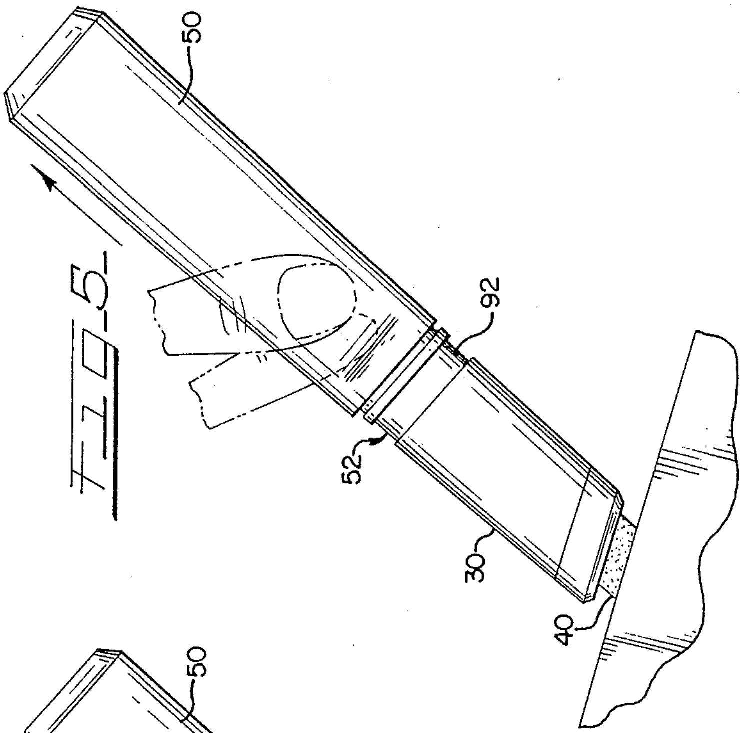
FIGS. 4 and 5 are illustrative drawings of the invention showing the method of use of the applicator in the essentially inverted position.
Figure 4:
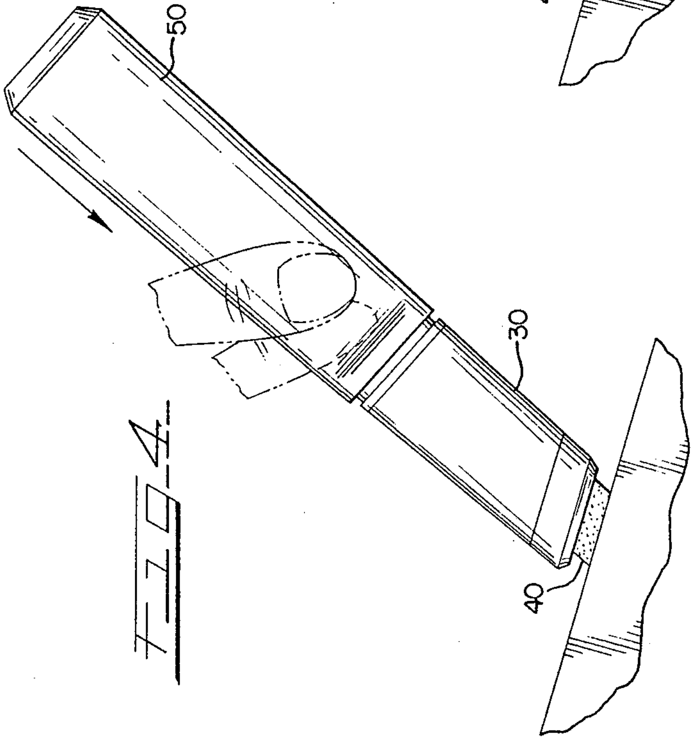

This telescoping and pumping action (described below) is illustrated in FIGS. 4 and 5, which show the apparatus in the essentially inverted position, as it would be oriented to apply a strip of insecticide along a floor, the inside lower surface of a cabinet, or like surface. FIG. 4 shows the apparatus with fluid reservoir 50 and applicator cap 30 telescoped into each other along slide area 92 (visible in FIG. 5) on fluid reservoir 50. This position as described above, forces the fluid from the pumping mechanism 82 and hence into pad of porous material 40. FIG. 5 shows fluid reservoir 50 and applicator cap 30 in the extended position, in which a predetermined volume of fluid is pulled into pumping mechanism 82 through fluid inlet 100. Obviously, protective overcap 54, which protects the apparatus during transport and handling and prevents fluid transfer means 80 from being accidentally activated, has been removed before the applicator is used.

FIGS. 6 and 7 show details of the pumping and ball check valve mechanisms, with dip tube 86 truncated. While many variations of pump and dip tube assemblies exist and may be used in the present invention, the preferred pumping mechanism is disclosed in U.S. Pat. No. 4,230,242, which is hereby incorporated by reference. The combination of this basic pump mechanism with the ball check valve, which creates the unique "any orientation" feature of the mechanism, is disclosed by pending U.S. patent Ser. No. 305,288. When applicator cap 30 is telescoped against the main body of fluid reservoir 50 (as shown in FIGS. 4 and 5), fluid outlet 70 is pressed back into pumping mechanism 82 and compresses biasing spring 94. When the pressure on applicator cap 30 is removed, by a slight lifting of the apparatus away from the surface, spring 94 is released which creates a decrease in pressure within chamber 96 of pumping mechanism 82 and thus draws fluid 90 up through dip tube 86 into chamber 96. When pressure is again applied to applicator cap 30, the enchambered fluid is then forced out through fluid outlet 70 and thus out into pad of porous material 40.

When the apparatus is in the upright orientation, the fluid transfer mechanism, as shown in FIG. 6, operates as follows: ball 98 sits over and thus blocks first fluid inlet 100, so that fluid 90 can only be drawn into pumping mechanism 82 through second fluid inlet 87 at the end of dip tube 86.

When the apparatus is held in an essentially inverted, angled orientation, as shown in FIG. 7, the fluid transfer mechanism operates as follows: ball 98 has, as the apparatus is tilted, rolled along channel 102 and, by so doing, uncovered first fluid inlet 100. In this orientation, as the pumping mechanism 82 is actuated as described above, fluid is drawn into chamber 96 through first fluid inlet 100. Second fluid inlet 87, in this orientation, will most likely be above the level of fluid 90.

With two potential fluid inlets, one (87) located near the bottom of the fluid reservoir and the other (100) located near the top of the fluid reservoir, fluid may be pumped in any orientation. The only limitation would be that if the apparatus were held at a shallow angle and inadequate fluid remained to cover fluid inlet 87. In such a case, the user would only need to steepen the angle to be able to pump out the remaining fluid.

FIGS. 8 and 9 show design and assembly de(ails of applicator cap 30 and pad of porous material 40. As is shown in FIG. 8, applicator cap 30 has formed within its top surface 20 recess 106, designed to accept pad of porous material 40, central apertures 102, and channels 104 extending outwardly from apertures 102. Fluid outlet 70 interference fits into receiving area 108, creating a seal. As is shown in FIG. 9, when the apparatus is assembled, fluid outlet 70 sets just below and in contact with the portion of applicator cap surface 20 that contains apertures 102. Pad of porous material sits above apertures 102 and channels 104 in recess 106. When fluid transfer means 80 is activated, as described above, fluid is ejected from fluid outlet 70, and then passes through apertures 102. Channels 104 then serve to spread the fluid ejected from apertures 102 along the underside of pad of porous material 40.

It should be noted that other types of dispersing means may be used with the present invention. For example, a brush-type applicator might be preferable to the pad of porous material were the fluid applicator to be used to apply cleansing fluids to fabrics or irregular surfaces.

Other modifications of the fluid applicator of the present invention will become apparent to those skilled in the art from an examination of the above patent specification and drawings. Therefore, other variations of the present invention may be made which fall within the scope of the following claims even though such variations were not specifically discussed above.

What is claimed is:

1. A fluid applicator apparatus comprising:

a fluid reservoir designed to hold fluid to be applied to a surface, the fluid reservoir having a neck opening at one end;

a fluid applicator means designed to apply fluid to the surface; and fluid transfer means for effecting a metered transfer of the fluid from the fluid reservoir to said fluid applicator means, the fluid transfer means being located upon and within the neck opening of the fluid reservoir, the fluid applicator means when being utilized to apply liquid to the surface being in fluid communication with the fluid transfer means;

the fluid transfer means further comprising an extensible and retractable spring-biased discharge means having a first and second fluid inlet and, spaced from both first and second fluid inlets, a fluid outlet, the first fluid inlet being located adjacent to the fluid discharge means and the second fluid inlet being located toward the distal end of a hollow tube member attached to and in fluid communication with the fluid discharge means;

the fluid applicator means further comprising in apertured applicator cap, having located on its outer surface a dispersing means, the aperture of the applicator cap being designed to receive the fluid outlet of the fluid discharge means, the applicator cap being moveable relating to the fluid reservoir in such a way that a predetermine force imposed on the applicator cap causes the fluid discharge means to be retracted and then extended, which in turn causes fluid to be transferred from the fluid reservoir to the dispersing means.

2. A fluid applicator apparatus according to claim 1 wherein the fluid discharge means further comprises a pumping mechanism including a spring-loaded piston within a pumping chamber, which, when the piston is retracted by a predetermined force upon the fluid applicator cap, forces the fluid out the fluid outlet and hence into the dispersing means and, when the force is removed and the piston extended, draws fluid from the fluid reservoir through either of the fluid inlets into the pumping chamber.

3. A fluid applicator apparatus according to claim 2 wherein the fluid outlet is interference fit into a recess within the top surface of the applicator cap.

4. A fluid applicator apparatus according to claim 2 wherein the fluid discharge means further includes a ball check valve, the ball check valve having a ball moveable in a channel so that, when the apparatus is in an upright position and fluid is drawn in to the pumping mechanism through the second inlet, the first fluid inlet is closed off, and, when the apparatus is in an inverted position, the first fluid inlet is exposed, and fluid is drawn into the pumping mechanism through the first inlet.

5. A fluid applicator apparatus according to claim 1 wherein the top surface of the applicator cap is, relative to the longitudinal axis of said fluid reservoir, oriented at an angle to the horizontal.

6. A fluid applicator apparatus according to claim 3 wherein the dispersing means is an element formed of porous material.

7. A fluid applicator apparatus according to claim 6 wherein the element formed of porous material is a pad of porous material which sits in the recess in the top surface of the apertured applicator cap, the recess having therein channeled fluid distribution means, extending from the aperture of the applicator cap and designed to distribute fluid discharged through the fluid outlet over a substantial portion of part of the pad of porous material.

8. A fluid applicator apparatus according to claim 1 wherein the fluid transfer means is crimped into the neck opening of the fluid reservoir.

9. A fluid applicator apparatus according to claim 1 further comprising a protective overcap which fits over the applicator cap and removably connects with a top section of the fluid reservoir.

10. A method of controlling an insect population comprising:

manipulating a fluid applicator apparatus comprising:

a fluid reservoir designed to hold fluid to be applied, having a neck opening at one end;

a fluid applicator means; and fluid transfer means for effecting a metered transfer of the fluid from the fluid reservoir to said fluid applicator means, the fluid transfer means being located upon and within the neck opening of the fluid reservoir;

the fluid transfer means further comprising an extensible and retractable spring-biased fluid discharge means having a first and a second fluid inlet and, spaced from both first and a second fluid inlets, a fluid outlet, the first fluid inlet being located adjacent to the fluid discharge means and the second fluid inlet being located toward the distal end of a hollow tube member attached to and in fluid communication with the fluid discharge means;

the fluid applicator means further comprising an apertured applicator cap, having located on its outer surface a dispersing means, the aperture of the applicator cap being designed to receive the fluid outlet of the fluid discharge means, the applicator cap being moveable relative to the fluid reservoir in such a way that a predetermine force imposed on the applicator cap causes the fluid discharge means to be retracted and then extended, which in turn causes fluid to be transferred from the fluid reservoir to the dispersing means; the pumping mechanism further including a ball check valve, the ball check valve having a ball moveable in a channel so that, when the apparatus is in an upright position and fluid is drawn into the pumping mechanism through the second inlet, the first inlet is closed off, and, when the apparatus is in an inverted position, the second fluid inlet is exposed, and fluid is drawn into the pumping mechanism through the second inlet in such a way that the insecticide solution contained in the apparatus is transferred from the fluid reservoir to the dispersing means located on the applicator cap;

pressing the dispersing means against a portion of a surface; and moving the applicator in such a direction that a strip of insecticide solution is applied upon the surface, applying further increments of pressure as necessary to effect the transfer of more insecticide solution if necessary to cover the area desired, thus applying an effective amount of the insecticide solution to the surface to produce the desired kill effect.

* * * * *